United States Patent
Yoshida

(10) Patent No.: US 8,919,152 B2
(45) Date of Patent: Dec. 30, 2014

(54) POROUS GLASS BASE MATERIAL MANUFACTURING METHOD AND GAS FLOW RATE CONTROL APPARATUS

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 353 days.

(21) Appl. No.: 12/464,680

(22) Filed: May 12, 2009

(65) Prior Publication Data

US 2009/0282870 A1    Nov. 19, 2009

(30) Foreign Application Priority Data

May 13, 2008 (JP) .................................. 2008-126148

(51) Int. Cl.
 *C03B 37/018* (2006.01)
 *C03B 37/014* (2006.01)

(52) U.S. Cl.
 CPC ......... *C03B 37/0142* (2013.01); *C03B 2207/06* (2013.01); *C03B 2207/22* (2013.01); *C03B 2207/36* (2013.01); *C03B 2207/70* (2013.01)
 USPC ................... 65/413; 65/414; 65/421

(58) Field of Classification Search
 CPC ............ C03B 37/0142; C03B 2207/06; C03B 2207/36; C03B 2207/22; C03B 2207/70
 USPC ........................... 65/413, 414, 421
 See application file for complete search history.

(56) References Cited

U.S. PATENT DOCUMENTS

| | | | |
|---|---|---|---|
| 4,810,189 A | 3/1989 | Mikami et al. | |
| 5,366,531 A * | 11/1994 | Koide et al. | 65/415 |
| 2002/0162359 A1* | 11/2002 | Tennent et al. | 65/391 |
| 2004/0055339 A1* | 3/2004 | Ishihara | 65/414 |
| 2004/0261460 A1* | 12/2004 | Roba et al. | 65/413 |
| 2005/0005648 A1* | 1/2005 | Lee et al. | 65/382 |
| 2005/0132753 A1* | 6/2005 | Shimizu et al. | 65/381 |
| 2006/0137404 A1 | 6/2006 | Nunome et al. | |

FOREIGN PATENT DOCUMENTS

| | | |
|---|---|---|
| CN | 1807302 A | 7/2006 |
| JP | S62-187135 A1 | 8/1987 |
| JP | H05-323130 A1 | 12/1993 |
| JP | 3543537 B2 | 4/1998 |
| JP | 3653902 B2 | 6/1998 |
| JP | H11-79774 A | 3/1999 |
| JP | 3591330 B2 | 4/2000 |
| JP | 3744350 B2 | 6/2002 |

(Continued)

OTHER PUBLICATIONS

Machine translation of JP 2003-165737, Method for Manufacturing Optical Fiber Preform, Masuda et al. Jun. 10, 2003.*

(Continued)

*Primary Examiner* — Queenie Dehghan

(57) ABSTRACT

There is provided a method for manufacturing a porous glass base material by using a porous glass base material manufacturing burner having an oxidizing gas discharge port. The method includes supplying a gas mixture obtained by blending together an oxidizing gas and an inert gas to the oxidizing gas discharge port at a start of deposition of a glass fine particle, and increasing a flow rate of the oxidizing gas supplied to the oxidizing gas discharge port while decreasing a flow rate of the inert gas supplied to the oxidizing gas discharge port.

4 Claims, 5 Drawing Sheets

(56) References Cited

FOREIGN PATENT DOCUMENTS

| | | | |
|---|---|---|---|
| JP | 2003-165737 | A1 | 6/2003 |
| JP | 2003-206154 | A1 | 7/2003 |
| JP | 2003-212555 | A1 | 7/2003 |
| JP | 2003-226544 | A1 | 8/2003 |
| JP | 2004-331440 | A1 | 11/2004 |
| JP | 2006-182624 | A1 | 7/2006 |

OTHER PUBLICATIONS

Chinese Office Action dated Nov. 16, 2012 in a counterpart Chinese patent application No. 200910138929.X.
European Office Action dated Mar. 16, 2012 in a counterpart European patent application No. 09 160 044.5. (This European Office Action cites US Patent No. 1 and Foreign Patent document No. 1, and JP2003-226544 which has been submitted in a previous IDS.).

* cited by examiner

POROUS GLASS BASE MATERIAL MANUFACTURING METHOD AND GAS FLOW RATE CONTROL APPARATUS

CROSS REFERENCE TO RELATED APPLICATION

This patent application claims priority from a Japanese patent application No. 2008-126148 filed on May 13, 2008, the contents of which are incorporated herein by reference.

BACKGROUND

1. Technical Field

The present invention relates to a porous glass base material manufacturing method and a gas flow rate control apparatus.

2. Description of the Related Art

Conventionally, a variety of methods are developed to manufacture an optical fiber base material. For example, a vapor phase axial deposition (VAD) method attaches a starting material to a shaft that is designed to move upward while rotating, hangs the starting material within a reaction chamber, and deposits glass fine particles that are generated by using a burner disposed within the reaction chamber onto the peripheral edge of the starting material. As an alternative example, an outside vapor deposition (OVD) method deposits glass fine particles that are generated in a flame of a burner onto a rotating starting material by reciprocating one of the burner and the starting material relatively to the other.

In the conventional art, a concentric multi-tube burner is used to fabricate a porous glass base material. The concentric multi-tube burner does not sufficiently blend a glass material gas, a combustible gas, and an oxidizing gas. Therefore, no sufficient reaction is caused to generate glass fine particles. As a result, the concentric multi-tube burner cannot achieve a high yield and has difficulties in fabricating a porous glass base material within a short period of time.

To solve this problem, Japanese Patent No. 1773359 proposes a multi-nozzle burner that is configured such that small-diameter oxidizing gas discharge ports are disposed within a combustible gas discharge port so as to surround a centrally arranged material gas discharge port.

Japanese Patent Application Publications Nos. 2003-206154, 2004-331440 and 2006-182624, and Japanese Patent No. 3744350 disclose inventions concerning the structure of the small-diameter oxidizing gas discharge ports in order to further improve deposition efficiency with the use of a multi-nozzle burner. Japanese Patent Application Publications Nos. 05-323130, 3543537 and Publication No. 2003-226544 disclose techniques to properly adjust the focus distance of the small-diameter oxidizing gas discharge ports. Japanese Patents Nos. 3591330 and 3653902, and Japanese Patent Application Publications Nos. 2003-165737 and 2003-212555 disclose techniques to properly adjust the gas flow rates and the gas linear velocities.

To manufacture a porous glass base material, a concentric multi-tube burner is conventionally utilized but has the following drawback. If a combustible gas discharge port is positioned adjacent to an oxidizing gas discharge port, the peripheral edges of the ports experience a temperature rise, and resultantly become burnt. To avoid such a burn, an additional discharge port is inserted between the combustible gas discharge port and the oxidizing gas discharge port in the concentric multi-tube burner, and the inserted additional discharge port is supplied with an inert gas.

On the other hand, there is developed a differently-configured burner in which small-diameter oxidizing gas discharge ports having the same focus distance are positioned within a combustible gas discharge port. In such a burner, the oxidizing gas discharged from the small-diameter oxidizing gas discharge ports has a relatively high linear velocity. For this reason, the peripheral edge of the burner is prevented from being burnt even if the combustible gas and the oxidizing gas are adjacent to each other. This type of burner, however, still has the following problem. An inert gas is supplied to the small-diameter oxidizing gas discharge ports as a purging gas while no deposition occurs, but stopped at the start of deposition to be replaced with an oxidizing gas. After this, the supply amount of the oxidizing gas is gradually increased. Here, the oxidizing gas has a low linear velocity at the exits of the discharge ports until the flow rate of the oxidizing gas reaches a steady level. This causes the reaction point between the combustible gas and the oxidizing gas to be close to the small-diameter oxidizing gas discharge ports. Therefore, the peripheral edges of the small-diameter oxidizing gas discharge ports are burnt.

SUMMARY

To solve the above drawback, according to the first aspect related to the innovations herein, one exemplary manufacturing method may include a method for manufacturing a porous glass base material by using a porous glass base material manufacturing burner having an oxidizing gas discharge port. The method includes supplying a gas mixture obtained by blending together an oxidizing gas and an inert gas to the oxidizing gas discharge port at a start of deposition of a glass fine particle, and increasing a flow rate of the oxidizing gas supplied to the oxidizing gas discharge port while decreasing a flow rate of the inert gas supplied to the oxidizing gas discharge port.

According to the second aspect related to the innovations herein, one exemplary gas flow rate control apparatus may include a gas flow rate control apparatus utilized when a porous glass base material is manufactured by using a porous glass base material manufacturing burner having an oxidizing gas discharge port for controlling flow rates of an oxidizing gas and an inert gas supplied to the oxidizing gas discharge port. Here, at a start of deposition of a glass fine particle, a gas mixture obtained by blending together the oxidizing gas and the inert gas is supplied to the oxidizing gas discharge port, and while the flow rate of the oxidizing gas supplied to the oxidizing gas discharge port is increased, the flow rate of the inert gas supplied to the oxidizing gas discharge port is decreased.

The inert gas that is blended with the oxidizing gas at the start of the deposition of the glass fine particle may be used for purging the oxidizing gas discharge port while no deposition of the glass fine particle takes place.

The flow rate of the inert gas blended with the oxidizing gas may be adjusted in such a manner that an exit linear velocity of the gas mixture discharged from the oxidizing gas discharge port is 2.0 m/s or higher.

The porous glass base material manufacturing burner may include a glass material gas discharge port, a combustible gas discharge port positioned outside the glass material gas discharge port concentrically with the glass material gas discharge port, and a plurality of the oxidizing gas discharge ports that are arranged within the combustible gas discharge port so as to form one or more circles concentric with the glass material gas discharge port. Here, the plurality of oxidizing gas discharge ports have substantially the same focus distance.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on embodiments, which do not intend to limit the scope of the present invention, but exemplify the invention. All of the features and the combinations thereof described in the embodiments are not necessarily essential to the invention.

Figure 1:
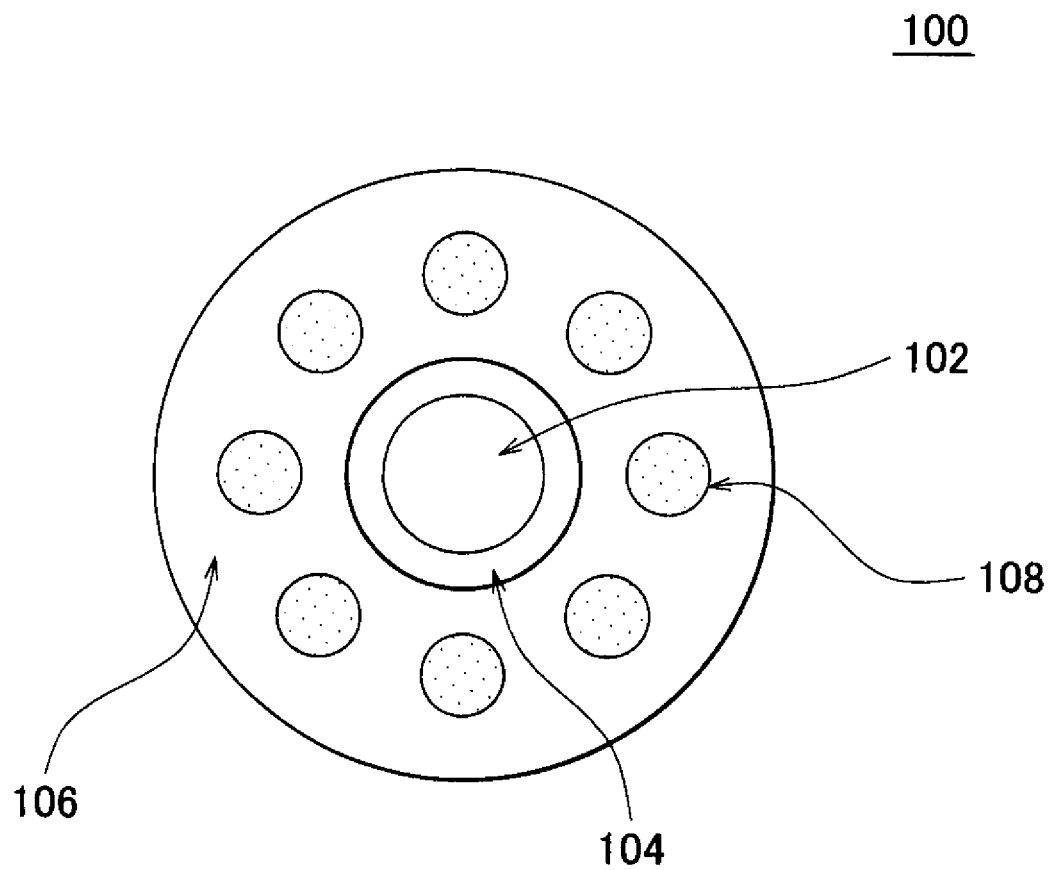
FIG. 1 illustrates an exemplary configuration of a porous glass base material manufacturing burner 100.

FIG. 1 illustrates an exemplary configuration of a porous glass base material manufacturing burner 100. The porous glass base material manufacturing burner 100 has a concentric multi-tube structure in which a plurality of gas discharge ports are concentrically arranged. Specifically speaking, the porous glass base material manufacturing burner 100 includes a glass material gas discharge port 102, an inert gas discharge port 104, a combustible gas discharge port 106, and small-diameter oxidizing gas discharge ports 108. The small-diameter oxidizing gas discharge ports 108 are shown as an example of oxidizing gas discharge ports.

The glass material gas discharge port 102 is positioned at the center of the porous glass base material manufacturing burner 100. The inert gas discharge port 104 is positioned outside the glass material gas discharge port 102 concentrically with the glass material gas discharge port 102. The combustible gas discharge port 106 is positioned outside the inert gas discharge port 104 concentrically with the glass material gas discharge port 102 and the inert gas discharge port 104. The small-diameter oxidizing gas discharge ports 108 are arranged within the combustible gas discharge port 106 so as to form a single circle that is concentric with the glass material gas discharge port 102. The small-diameter oxidizing gas discharge ports 108 may all have substantially the same focus distance.

In the example shown in FIG. 1, eight small-diameter oxidizing gas discharge ports 108, which all has a focus distance of 150 mm, are arranged within the combustible gas discharge port 106 so as to form a single circle that is concentric with the glass material gas discharge port 102. Alternatively, a plurality of small-diameter oxidizing gas discharge ports 108 may be arranged within the combustible gas discharge port 106 so as to form more than one circle that are concentric with the glass material gas discharge port 102.

Figure 2:
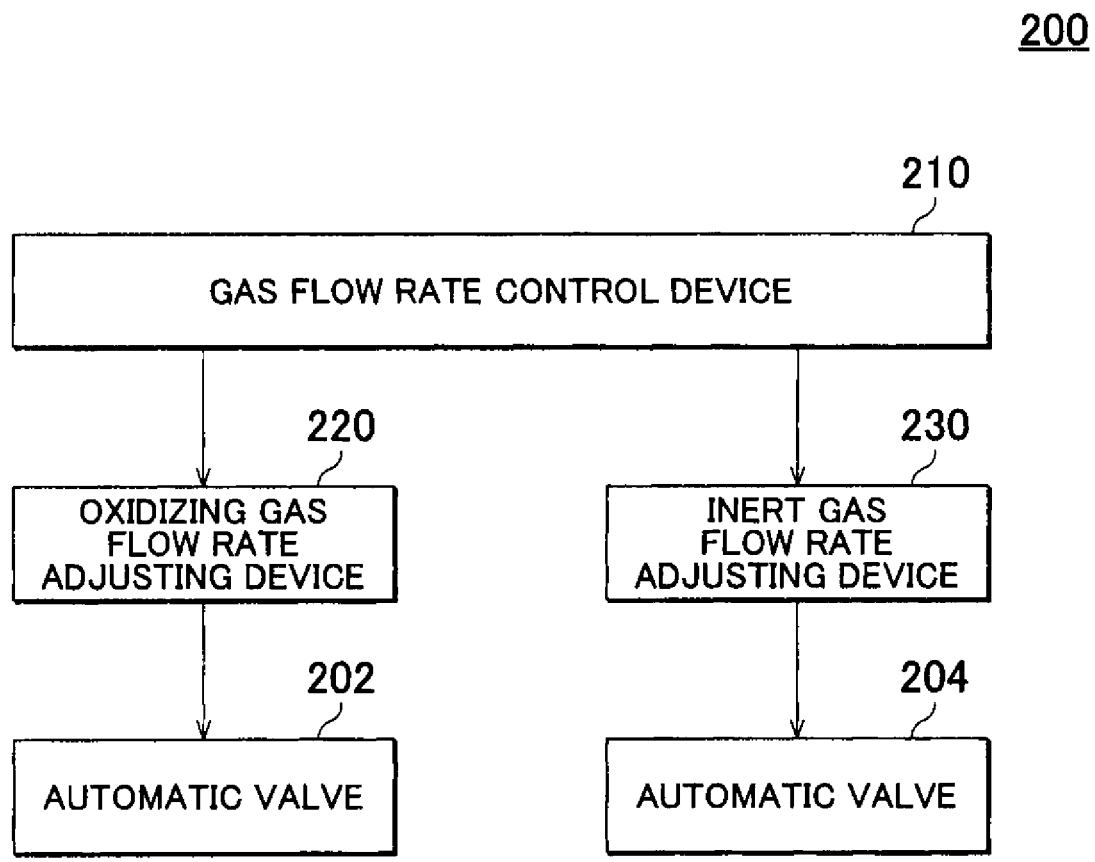
FIG. 2 illustrates an exemplary configuration of a gas flow rate control system 200.

FIG. 2 illustrates an exemplary configuration of a gas flow rate control system 200. The gas flow rate control system 200 includes an automatic valve 202, an automatic valve 204, a gas flow rate control device 210, an oxidizing gas flow rate adjusting device 220, and an inert gas flow rate adjusting device 230.

The automatic valve 202 is provided on the supply path of an oxidizing gas to the porous glass base material manufacturing burner 100. The automatic valve 204 is provided on the supply path of an inert gas that is designed to purge the oxidizing gas.

The gas flow rate control device 210 controls the flow rates of the oxidizing gas and the inert gas supplied to the porous glass base material manufacturing burner 100. Specifically speaking, the gas flow rate control device 210 transmits control information indicative of the flow rate of the oxidizing gas to the oxidizing gas flow rate adjusting device 220. Furthermore, the gas flowrate control device 210 transmits control information indicative of the flow rate of the inert gas to the inert gas flow rate adjusting device 230. Here, the control information may be indicative of the flow speed of the oxidizing gas or inert gas.

The oxidizing gas flow rate adjusting device 220 controls the flow rate of the oxidizing gas supplied to the porous glass base material manufacturing burner 100, in accordance with the control information received from the gas flow rate control device 210. Furthermore, the inert gas flow rate adjusting device 230 controls the flow rate of the inert gas supplied to the porous glass base material manufacturing burner 100, in accordance with the control information received from the gas flow rate control device 210.

The gas flow rate control device 210 controls the flow rates in such a manner that a gas mixture containing the oxidizing gas and the inert gas is supplied to the small-diameter oxidizing gas discharge ports 108 at the start of glass fine particle deposition and the flow rate of the oxidizing gas is subsequently gradually increased while the flow rate of the inert gas is decreased. For the inert gas that is blended with the oxidizing gas at the start of the glass fine particle deposition, the gas flow rate control device 210 indicates that the inert gas that is used to purge the small-diameter oxidizing gas discharge ports 108 while no glass fine particle deposition takes place is used. The gas flow rate control device 210 adjusts the flow rate of the inert gas to be blended with the oxidizing gas such that the gas discharged from the small-diameter oxidizing gas discharge ports 108 has an exit linear velocity of 2.0 m/s or higher.

The gas flow rate control device 210 may be a personal computer including a CPU, a memory, a hard disk, a communication interface and the like. The gas flow rate control device 210 may store, on a recording medium such as a memory or hard disk, a program or data for controlling the flow rates of the oxidizing gas and the inert gas. In this case, the gas flow rate control device 210 may control the flow rates of the oxidizing gas and the inert gas by executing the program stored on the recording medium or using the data stored on the recording medium.

As an alternative example, the flow rates of the oxidizing gas and the inert gas may be controlled by a user who manually manipulates the oxidizing gas flow rate adjusting device 220 and the inert gas flow rate adjusting device 230.

According to the above-described present embodiment, a gas mixture of an oxidizing gas and an inert gas is supplied to the small-diameter oxidizing gas discharge ports 108 at the beginning of the manufacturing process. Conventionally, during the initial stage of the deposition, the discharged gas from the small-diameter oxidizing gas discharge ports 108 has a low linear velocity since only the oxidizing gas is supplied, and the peripheral edges of the ports 108 are thus likely to become burnt. With the above-described configuration, however, the present embodiment can increase the linear velocity of the discharged gas during the initial stage of the deposition, thereby preventing the peripheral edges of the ports 108 from being burnt. After the start of the manufacturing process, the present embodiment gradually increases the flow rate of the oxidizing gas while decreasing the flow rate of the inert gas, so as to reduce the inert gas that hinders the reaction with it being possible to maintain a predetermined linear velocity. The supply of the inert gas is stopped after the oxidizing gas by itself can sufficiently maintain the predetermined linear velocity. In this manner, the linear velocity of the gas discharged from the small-diameter oxidizing gas discharge ports 108 is maintained at a necessary level throughout the deposition, and the peripheral edges of the ports 108 can be thus prevented from being burnt. As a consequence, the productivity can be improved.

The following describes embodiments of the present invention in more detail based on implementation examples and a comparative example. Note that, however, the present invention is not limited to such.

IMPLEMENTATION EXAMPLES

Preliminary Test

The porous glass base material manufacturing burner 100 illustrated in FIG. 1 was used. The glass material gas discharge port 102 was supplied with a glass material $SiCl_4$ and an oxidizing gas $O_2$. The inert gas discharge port 104 was supplied with a seal gas $N_2$. The combustible gas discharge port 106 was used to supply a combustible gas $H_2$, and the small-diameter oxidizing gas discharge ports 108 were used to supply an oxidizing gas $O_2$.

While the oxidizing gas $O_2$ was supplied to the small-diameter oxidizing gas discharge ports 108 at the rate of 1.0 L/min with the flow rate of the inert gas $N_2$ added to the oxidizing gas $O_2$ being varied, the exit linear velocity of the gas discharged from the small-diameter oxidizing gas discharge ports 108 and the burn that may occur at the peripheral edges of the small-diameter oxidizing gas discharge ports 108 were observed. The observation proved that, when the exit linear velocity of the gas discharged from the small-diameter oxidizing gas discharge ports 108 was equal to or higher than 2.0 m/s, the peripheral edges of the small-diameter oxidizing gas discharge ports 108 were not burnt, as shown in Table 1. However, when the exit linear velocity of the gas discharged from the small-diameter oxidizing gas discharge ports 108 is equal to or lower than 1.8 m/s, a sufficient linear velocity was not achieved for the discharged gas and the peripheral edges of the small-diameter oxidizing gas discharge ports 108 were burnt.

TABLE 1

| LINEAR VELOCITY (m/s) | PERIPHERAL EDGES OF PORTS |
| --- | --- |
| 1.4 | BURNT |
| 1.6 | BURNT |
| 1.8 | BURNT |
| 2.0 | NOT BURNT |
| 2.2 | NOT BURNT |
| 2.4 | NOT BURNT |
| 2.6 | NOT BURNT |
| 2.8 | NOT BURNT |

First Implementation Example

Figure 3:
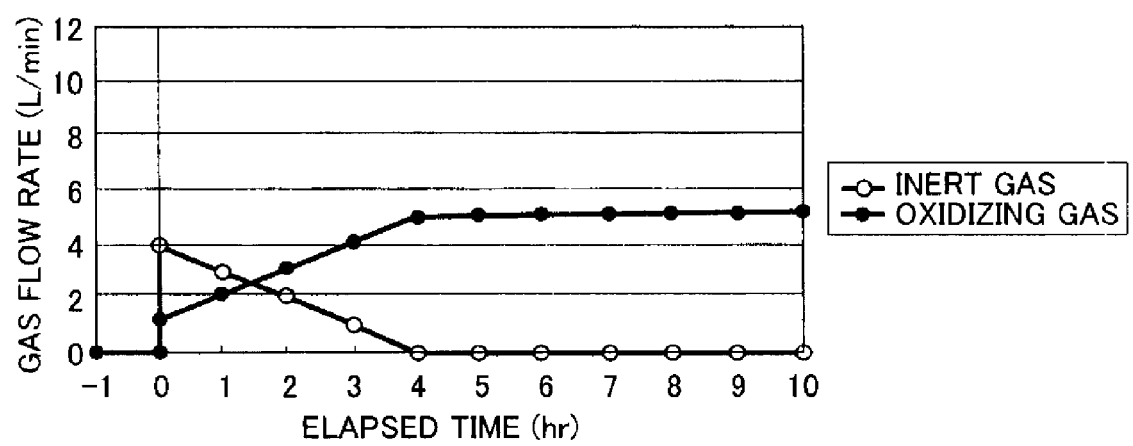
FIG. 3 is a graph showing the relation between the amount of the gas supplied to small-diameter oxidizing gas discharge ports 108 and the elapsed time in a first implementation example.

The porous glass base material manufacturing burner 100 used in the preliminary test was used to manufacture an optical fiber porous glass base material. A hydrogen gas $H_2$ was supplied in advance to the combustible gas discharge port 106 so that ignition was preliminarily generated. As shown in FIG. 3, at the start of the deposition of glass fine particles, the oxidizing gas $O_2$ of 1.0 L/min and the inert gas $N_2$ of 4.0 L/min were blended together and the resulting gas mixture was supplied to the small-diameter oxidizing gas discharge ports 108. In addition, through the glass material gas discharge port 102, the glass material gas $SiCl_4$ was supplied at the rate of 0.6 L/min. During the following four hours, while the oxidizing gas $O_2$ and the glass material gas $SiCl_4$ were increased, the inert gas $N_2$ was decreased. When the flow rate of the oxidizing gas $O_2$ reached 5.0 L/min, the supply of the inert gas $N_2$ was stopped. During this, the exit linear velocity of the gas discharged from the small-diameter oxidizing gas discharge ports 108 was maintained at 3.0 m/s. Therefore, the peripheral edges of the small-diameter oxidizing gas discharge ports 108 were not burnt even during the initial stage of the deposition in which the amount of the oxidizing gas is small.

Second Implementation Example

Figure 4:
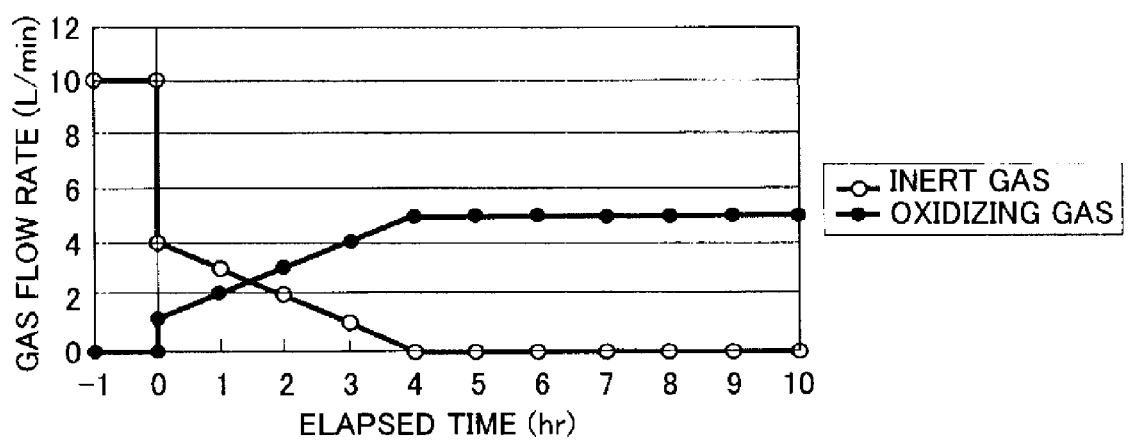
FIG. 4 is a graph showing the relation between the amount of the gas supplied to the small-diameter oxidizing gas discharge ports 108 and the elapsed time in a second implementation example.

The porous glass base material manufacturing burner 100 used in the first implementation example was used. A hydrogen gas $H_2$ was supplied in advance to the combustible gas discharge port 106 so that ignition was preliminarily generated. As shown in FIG. 4, at the start of the deposition of glass fine particles, the oxidizing gas $O_2$ started to be supplied to the small-diameter oxidizing gas discharge ports 108 at the rate of 1.0 L/min, and the inert gas $N_2$, which was supplied for purging the small-diameter oxidizing gas discharge ports 108 while no manufacturing process was taking place, was reduced in flow rate from 10.0 L/min to 4.0 L/min, so that the oxidizing gas $O_2$ and the inert gas $N_2$ were blended together and the resulting gas mixture was supplied to the small-diameter oxidizing gas discharge ports 108. Through the glass material gas discharge port 102, the glass material gas $SiCl_4$ was supplied at the rate of 0.6 L/min. During the following four hours, while the oxidizing gas $O_2$ and the glass material gas $SiCl_4$ were increased, the inert gas $N_2$ was decreased. When the flow rate of the oxidizing gas $O_2$ reached 5.0 L/min, the supply of the inert gas $N_2$ was stopped. During this, the exit linear velocity of the gas discharged from the small-diameter oxidizing gas discharge ports 108 was maintained at 3.0 m/s. Therefore, the peripheral edges of the small-diameter oxidizing gas discharge ports 108 were not burnt even during the initial stage of the deposition in which the flow rate of the oxidizing gas $O_2$ is low.

Comparative Example

Figure 5:
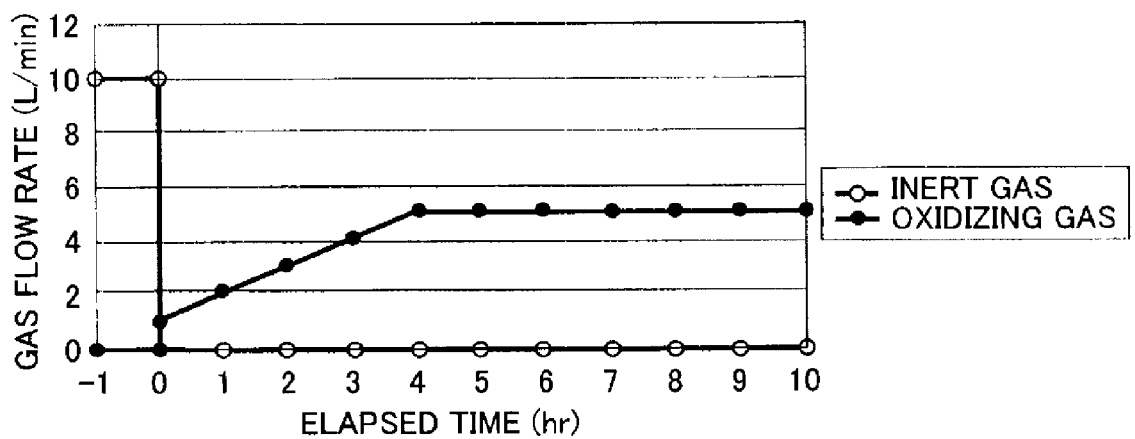
FIG. 5 is a graph showing the relation between the amount of the gas supplied to the small-diameter oxidizing gas discharge ports 108 and the elapsed time in a first comparable example.

The porous glass base material manufacturing burner 100 used in the first implementation example was used. A purging gas $N_2$ was supplied to the small-diameter oxidizing gas discharge ports 108, and a hydrogen gas $H_2$ was supplied in advance to the combustible gas discharge port 106 so that ignition was preliminarily generated. As shown in FIG. 5, the supply of the purging gas $N_2$ was stopped at the same time as the start of the glass fine particle generation, and the oxidizing gas $O_2$ instead started to be supplied and gradually increased. After four hours, the flow rate of the oxidizing gas reached a steady level. In this case, the peripheral edges of the small-diameter oxidizing gas discharge ports 108 were burned during the first 1.5 hours after the start of the deposition, in which the gas flow rate was low.

As is apparent from the above, the first and second implementation examples adjust the flow rate of the inert gas $N_2$ blended with the oxidizing gas $O_2$ in order to maintain the exit linear velocity of the gas discharged from the small-diameter oxidizing gas discharge ports 108 at a desired level until the flow rate of the oxidizing gas $O_2$ discharged from the small-diameter oxidizing gas discharge ports 108 reaches a predetermined level. In this manner, the first and second implementation examples can prevent the peripheral edges of the small-diameter oxidizing gas discharge ports 108 from being burnt. Specifically, when the exit linear velocity of the gas discharged from the small-diameter oxidizing gas discharge ports 108 is maintained at the level of 2.0 m/s or higher, the peripheral edges of the small-diameter oxidizing gas discharge ports 108 can be more favorably prevented from being burnt.

Preventing the peripheral edges of the small-diameter oxidizing gas discharge ports 108 from being burnt, the first and second implementation examples can increase the lifetime of the porous glass base material manufacturing burner 100. If the peripheral edges of the small-diameter oxidizing gas discharge ports 108 are burnt, resulting impurities may enter into a porous glass base material and create air bubbles when the porous glass base material is sintered. Such air bubbles may degrade the quality of the porous glass base material but can be prevented by the first and second implementation examples.

What is claimed is:

1. A method for manufacturing a porous glass base material by using a porous glass base material manufacturing burner having a glass material gas discharge port and a plurality of oxidizing gas discharge ports arranged outside the glass material gas discharge port so as to form one or more circles concentric with the glass material gas discharge port, each oxidizing gas discharge port having a diameter smaller than that of the glass material gas discharge port, the method comprising:

supplying gas to the oxidizing gas discharge ports such that, at a start of deposition of a glass fine particle, the gas includes a gas mixture obtained by blending together an oxidizing gas and an inert gas;

increasing a flow rate of the oxidizing gas supplied to the oxidizing gas discharge ports while decreasing a flow rate of the inert gas supplied to the oxidizing gas discharge ports to maintain an exit linear velocity of the gas discharged from the oxidizing gas discharge ports of 2.0 m/s or higher for the duration of the deposition of the glass fine particle, wherein said increasing while decreasing includes keeping a sum of the flow rates of the inert gas and the oxidizing gas substantially constant for the duration of the deposition of the glass fine particle.

2. The method as set forth in claim 1, wherein the porous glass base material manufacturing burner includes a combustible gas discharge port positioned outside the glass material gas discharge port concentrically with the glass material gas discharge port, the plurality of the oxidizing gas discharge ports are arranged within the combustible gas discharge port, and the plurality of oxidizing gas discharge ports have substantially the same focus distance.

3. The method as set forth in claim 1, wherein said increasing while decreasing includes increasing the flow rate of the oxidizing gas supplied to the oxidizing gas discharge ports while decreasing the flow rate of the inert gas supplied to the oxidizing gas discharge ports to maintain an exit linear velocity of the gas discharged from the oxidizing gas discharge ports of 3.0 m/s or lower for the duration of the deposition of the glass fine particle.

4. The method as set forth in claim 1, further comprising supplying the inert gas to the oxidizing gas discharge ports as a purging gas while no deposition of the glass fine particle takes place.

* * * * *